United States Patent [19]

Schirmer et al.

[11] 4,007,001

[45] Feb. 8, 1977

[54] COMBUSTORS AND METHODS OF OPERATING SAME

[75] Inventors: Robert M. Schirmer; John W. Vanderveen; Paul J. Cheng, all of Bartlesville, Okla.

[73] Assignee: Phillips Petroleum Company, Bartlesville, Okla.

[22] Filed: Apr. 14, 1975

[21] Appl. No.: 567,829

[52] U.S. Cl. .............................. 431/10; 60/39.65; 431/165; 431/173; 431/352

[51] Int. Cl.² .............................. F02C 7/26

[58] Field of Search ................ 431/352, 10, 173, 9, 431/165; 60/39.65

[56] References Cited

UNITED STATES PATENTS

| | | | |
|---|---|---|---|
| 2,973,727 | 3/1961 | Horthcote | 431/173 |
| 3,030,773 | 4/1962 | Johnson | 60/39.65 |
| 3,229,748 | 1/1966 | Spielman | 431/352 |
| 3,490,230 | 1/1970 | Pillsbury et al. | 60/39.65 |

*Primary Examiner*—Edward G. Favors

[57] ABSTRACT

New combustors, and methods of operating same, which produce lower emissions, particularly lower emissions of nitrogen oxides and CO, are provided. A first stream of air is introduced, either radially or axially, to a first combustion region of the combustor. A second stream of air is introduced tangentially into said first combustion region. A third stream of air is introduced tangentially into a second combustion region of the combustor. The amount of said first stream of air admitted to the first combustion region is varied in accordance with the fuel flow to said first combustion region.

25 Claims, 10 Drawing Figures

COMBUSTORS AND METHODS OF OPERATING SAME

This invention relates to new combustors and methods of operating same.

Air pollution has become a major problem in the United States and other highly industrialized countries of the world. Consequently, the control and/or reduction of said pollution has become the object of major research and development effort by both governmental and nongovernmental agencies. Combustion of fossil fuel is a primary source of said pollution. It has been alleged, and there is supporting evidence, that the automobiles employing conventional piston-type engines burning hydrocarbon fuels are a major contributor to said pollution. Vehicle emission standards have been set by the United States Environmental Protection Agency (EPA) which are sufficiently restrictive to cause automobile manufacturers to consider employing alternate engines instead of the conventional piston engine.

The gas turbine engine is being given serious consideration as an alternate engine. CO emissions in conventional prior art gas turbine processes operated for maximum fuel combustion efficiency are not usually a problem. However, nitrogen oxides emissions, usually referred to as $NO_x$, are a problem because the high temperatures generated in such prior art processes favor the production of $NO_x$. A gas turbine engine employed in an automobile or other vehicle will be operated over a wide range of varying operating conditions including idle, low speed, moderate speed, high speed, acceleration, and deceleration. These varying conditions create serious probles in controlling both $NO_x$ and CO emissions. Frequently, when a combustor is operated for the control of one of $NO_x$ or CO emissions, control of the other is lost. Both must be controlled. Thus, there is a need for a combustor of practical and/or realistic design, which can be operated in a manner such that the pollutant emissions therefrom will meet said EPA standards. Even a combustor, and/or a combustion process, giving reduced pollutant emissions approaching said standards would be a great advance in the art. Such a combustor, or process, would have great potential value because it is possible the presently very restrictive EPA standards may be relaxed even further than has been recently indicated.

The present invention solves the above-described problems by providing new combustors, and methods of operating same, which produce lower emissions, particularly lower emissions of nitrogen oxides (usually refered to as $NO_x$) and CO. The combustors of the invention can be operated over widely varying operating conditions with reduction and control of both $NO_x$ and CO emissions. The invention provides methods for operating the combustors of the invention with a variable first stream of air supplied to a first combustion region of the combustor, and supplying tangentially introduced streams of air to said first and a second combustion region of the combustor. The combustors of the invention are characterized by remarkable combustion stability over a wide range of operating conditions.

Thus, according to the invention, there is provided a combustor comprising in combination: a flame tube; a dome member disposed at the upstream end of said flame tube; a fuel inlet means disposed in said dome member for introducing a stream of fuel into an upstream first combustion section of said flame tube; a variable first air inlet means provided in said dome member for admitting a variable volume of a first stream of air through said dome member, around said fuel inlet means, and into said first combustion section of said flame tube; a second air inlet means diposed in the wall of said flame tube for tangentially admitting a second stream of air into said first combustion section tangential to the wall thereof; amd a third air inlet means disposed in the wall of said flame tube downstream from said second air inlet means for tangentially admitting a third stream of air into a second combustion section located in said flame tube downstream from and in communication with said first combustion section.

Further according to the invention, there is provided a method for burning a fuel in a combustion zone having a first upstream combustion region and a second combustion region located downstream from said first combustion region, which method comprises: introducing a stream of fuel into the upstream end portion of said first combustion region; introducing a first stream of air at a controlled but variable rate into said upstream end portion of said flame tube; tangentially introducing a second stream of air into said first combustion region and forming a combustible mixture of said fuel and said streams of air; causing at least partial combustion of said combustible mixture and forming hot combustion products; tangentially introducing a third stream of air into said second combustion region; and controlling said variable rate of introduction of said first stream of air in accordance with the rate of introduction of said fuel.

Figure 10:
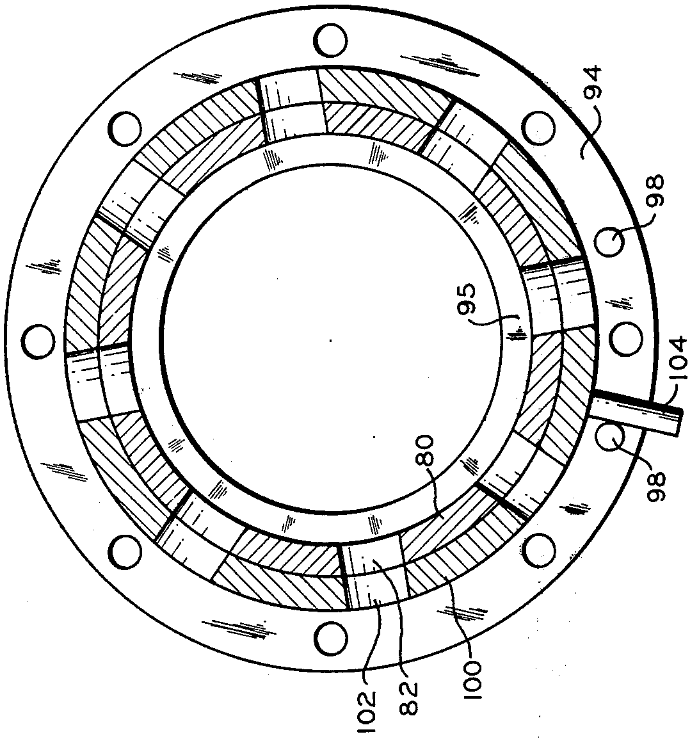
Figure 8:
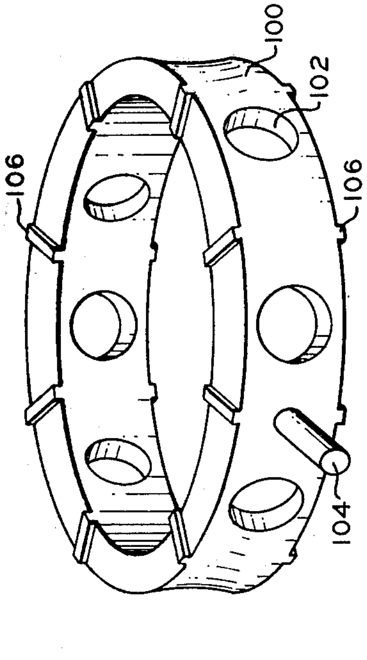
Figure 9:
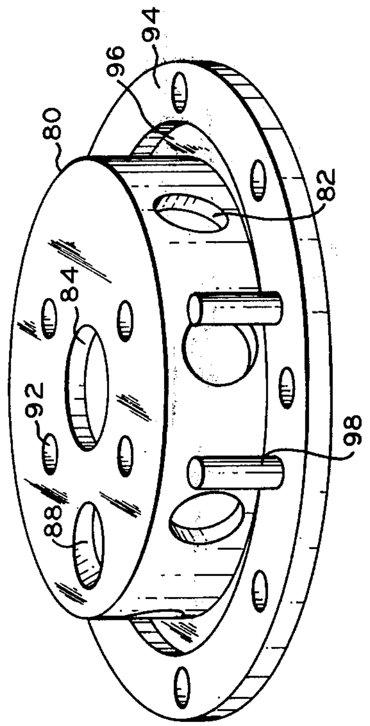

FIGS. 8, 9, and 10 illustrate elements of another variable dome member which can be employed in combination with the combustors of the invention.

Referring now to the drawings, wherein like or similar reference numerals are employed to denote like or similar elements, the invention will be more fully explained.

Figure 1:
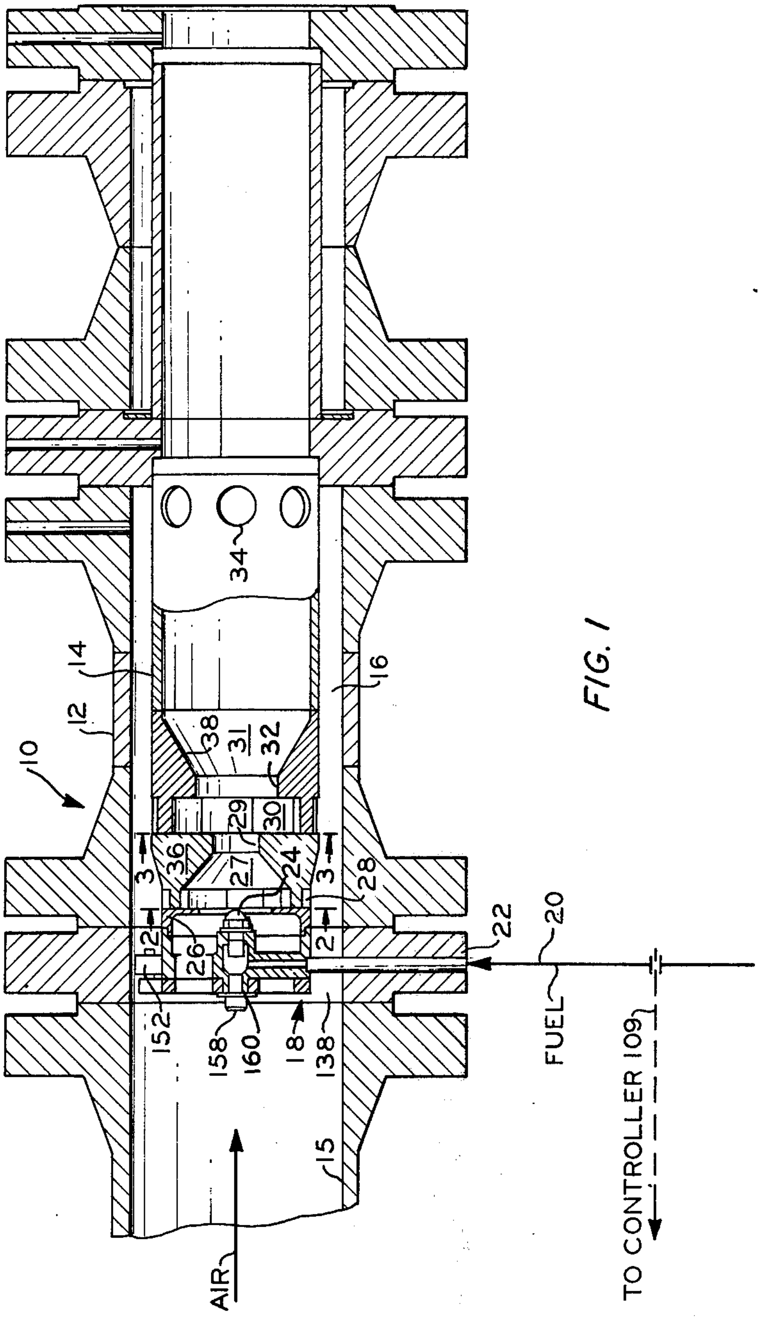
FIG. 1 is a view, partially in cross section, of a combustor in accordance with the invention.
Figure 3:
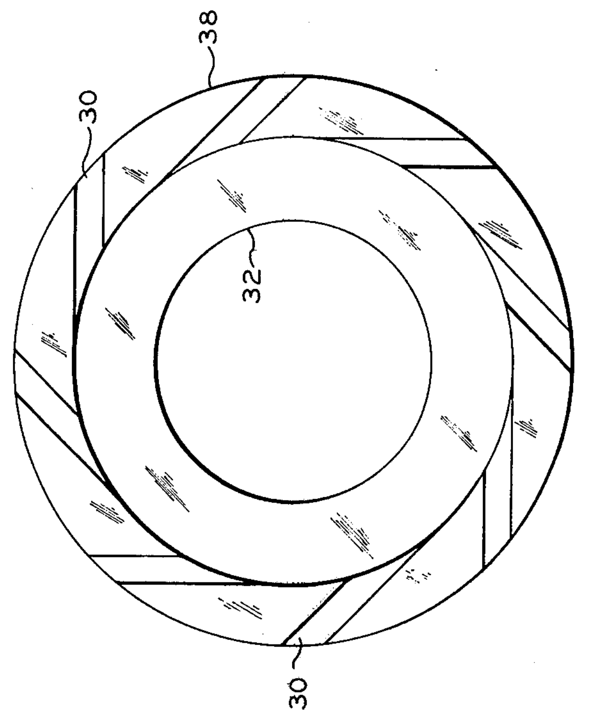
FIG. 3 is a view, in elevation, taken along the line 3—3 of FIG. 1 and illustrating another set of tangential entry ports or slots.
Figure 2:
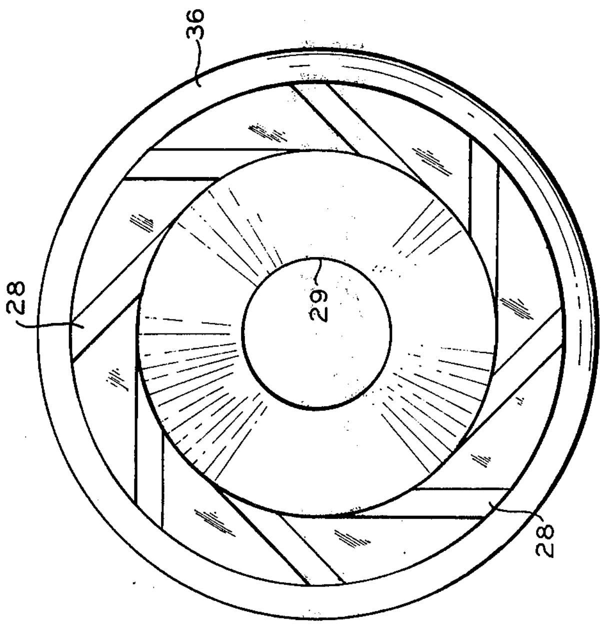
FIG. 2 is an enlarged view, in elevation, taken along the line 2—2 of FIG. 1 and illustrating one set of tangential entry ports or slots.

FIGS. 1, 2, and 3 illustrate a combustor in accordance with the invention. Said combustor is denoted generally by the reference numberal 10. Preferably, said combustor comprises an outer housing or casing 12 having a flame tube 14 disposed, preferably concentrically, therein and spaced apart from said casing to form an annular chamber 16 between said casing 12 and said flame tube 14. Said flame tube can be supported in said housing or casing by any suitable means. While it is preferred to provide the combustor with an annular casing or housing, similarly as illustrated, so as to provide said annular space 16 for suplying air to the various inlets (described hereinafter) in said flame tube, it is within the scope of the invention to alter the configuration of said housing or casing, or to omit said housing or casing and supply said air inlets individually by means of individual conduits. Said flame tube 14 is provided at its upstream end with a dome member 18. A fuel inlet means is provided for introducing a stream of fuel into the upstream end portion of said flame tube. As illustrated in FIG. 1, said fuel inlet means comprises a fuel conduit 20 leading from a source of fuel and extending through fuel flange 22 into communication with the central cavity formed in the downstream side of dome member 18 and which is adapted to receive fuel nozzle 24 mounted therein. An annular orifice means is disposed on the downstream side of said dome member 18. Said orifice means can be formed integrally with said dome member or, as here illustrated, can preferably comprise an annular adaptor 26 disposed between the downstream end of said dome member 18 and the upstream end of said flame tube 14. A first orifice formed in said orifice means or adaptor 26 can be considered to define the outlet from said dome member 18 and the inlet into the first combustion region 27.

A variable first air inlet means is provided in said dome member for admitting a variable volume of a first stream of air through said dome member, around said fuel inlet nozzle 24, and into said first combustion region 27 of said flame tube. As described further hereinafter, said variable first air inlet means comprises at least one air passage means of variable cross-sectional area provided in and extending through said dome member 18 into communication with said first combustion region 27, and means for varying the cross-sectional area of said air passage means and thus controlling the volume of said first stream of air admitted to said first combustion region. A second air inlet means is disposed in the wall of said flame tube for tangentially admitting a second stream of air into said first combustion region 27 tangential to the wall thereof. Said second air inlet means preferably comprises a plurality of tangential slots 28 extending through the wall of the upstream end portion of said flame tube 14 at a first station in the flame tube adjacent said outlet from said dome member 18. A third air inlet means is disposed in the wall of said flame tube downstream from said second air inlet means for tangentially admitting a third stream of air into a second combustion region 31 located in said flame tube 14 downstream from and in communication with said first combustion region 27. Said third air inlet means preferably comprises a plurality of tangential slots 30 extending through the wall of an intermediate portion of said flame tube 14 at a second station in the flame tube adjacent and downstream from a second orifice 29 which can be considered to define the outlet from said first combustion region. A third orifice 32 is disposed in said flame tube adjacent and downstream from said tangential slots 30. Preferably, a fourth air inlet means, comprising at least one opening 34, is provided in the wall of said flame tube at a third station downstream from said third air inlet means 30 and said third orifice 32 for admitting a fourth stream of air comprising quench or dilution air into said flame tube 14.

Said flame tube 14 can be fabricated integrally if desired. However, for convenience in fabrication, said flame tube can preferably be formed with its wall divided into separate sections similarly as here illustrated. Thus, in one preferred embodiment said tangential slots 28 can be formed in an upstream first wall section 36 of said flame tube, preferably in the upstream end portion of said first wall section with the downstream wall of said adaptor 26 forming the upstream walls of said slots 28. In this preferred embodiment said second orifice 29 is formed in the downstream end portion of said first wall section 36. In said preferred embodiment said tangential slots 30 can be formed in an intermediate second wall section 38 located adjacent and downstream from said first wall section 36. Preferably, said second wall section 38 is disposed with its upstream edge contiguous to the downstream edge of said first wall section 36, and said tangential slots 30 are formed in the upstream end portion of said second wall section 38 with the downstream edge of said first wall section 36 forming the upstream walls of said slots 30. In this preferred embodiment said third orifice 32 is formed in said second wall section 38 and adjoins said slots 30 formed therein. Preferably, the inner wall surface of said first wall section 36 tapers inwardly from the downstream edge of said tangential slots 28 to the upstream edge of said second orifice 29 to form an inwardly tapered passageway from said slots to said orifice. Preferably, the inner wall surface of said second wall section 38 tapers outwardly from the downstream edge of said third orifice 32 to form an outwardly flaring passageway from said orifice to the enlarged portion of the flame tube comprising second combustion region 31 and the third wall section of said flame tube.

It will be understood that the combustors described herein can be provided with any suitable type of ignition means and, if desired, means for introducing a pilot fuel to initiate combustion. For example, a sparkplug (not shown) can be mounted to extend into first combustion region 27.

Referring to FIG. 1, for example, in the combustors of the invention the first combustion region can be considered to be the region from the downstream tip of fuel nozzle 24 to the midpoint of the tangential slots 30, and the second combustion region can be considered to be the region from the midpoint of said tangential slots 30 to the midpoint of the openings 34.

Said second orifice 29 and said third orifice 32 have been illustrated as being circular in shape and this is usually preferred. However, it is within the scope of the invention for either or both of said orifices to have other shapes, e.g., trianguar.

Figure 4:
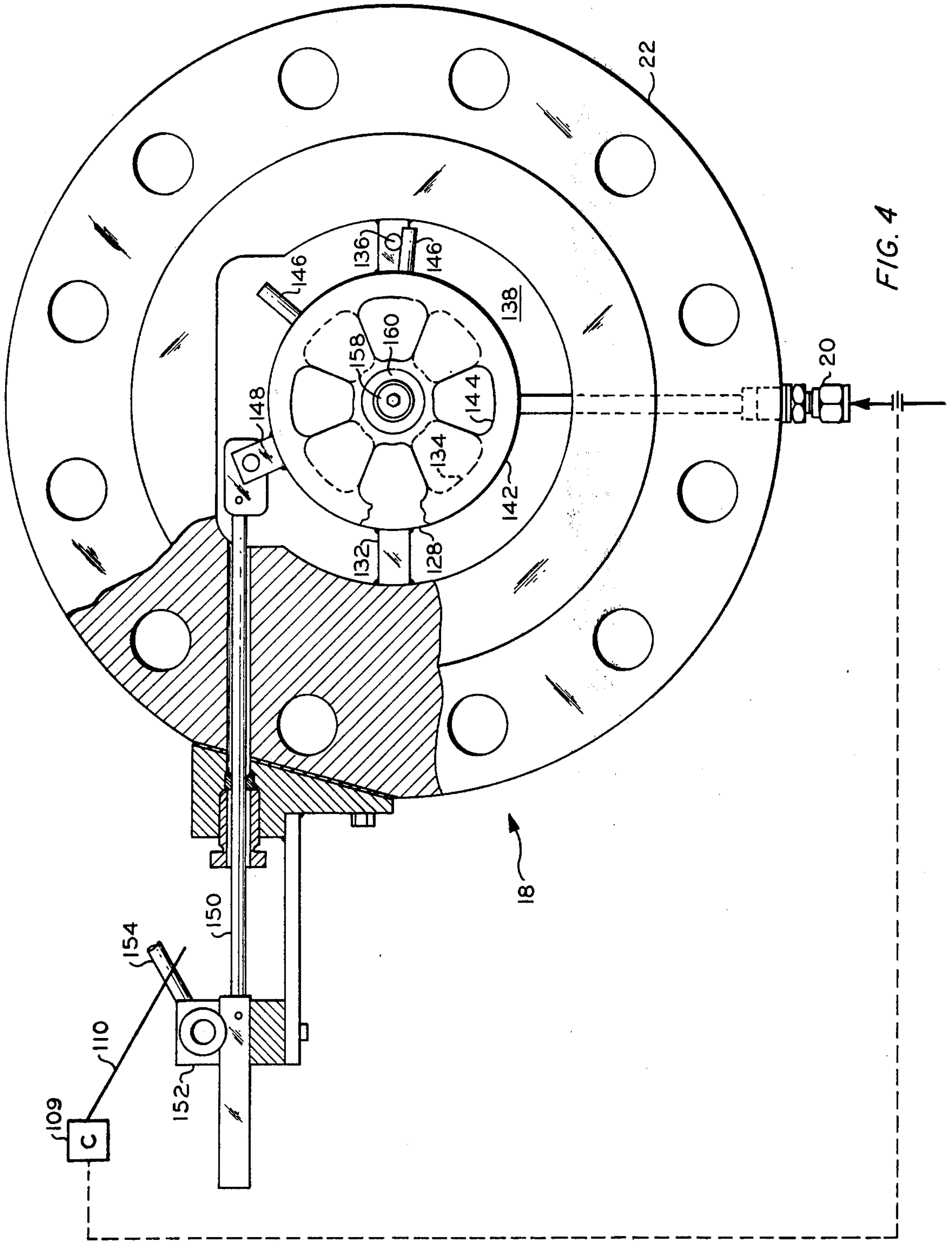
FIG. 4 is a view, partly in cross section, looking at the upstream side of the dome of the combustor of FIG. 1.
Figure 5:
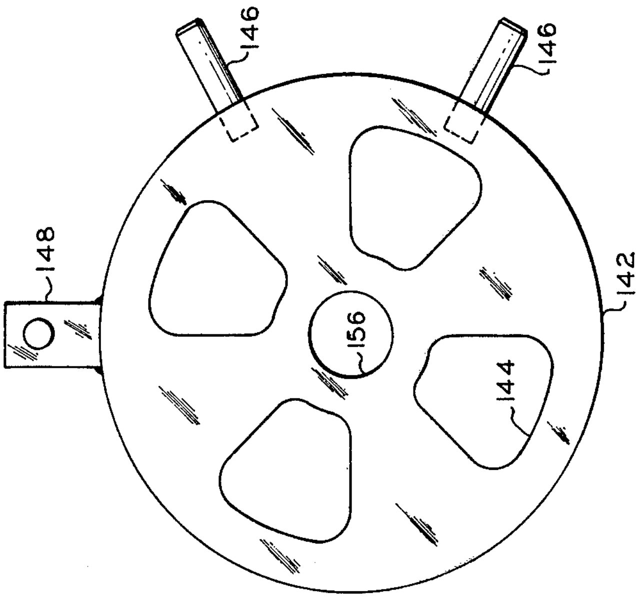
FIG. 5 is a view in elevation of an element of the dome of the combustor of FIG. 1.
Figure 6:
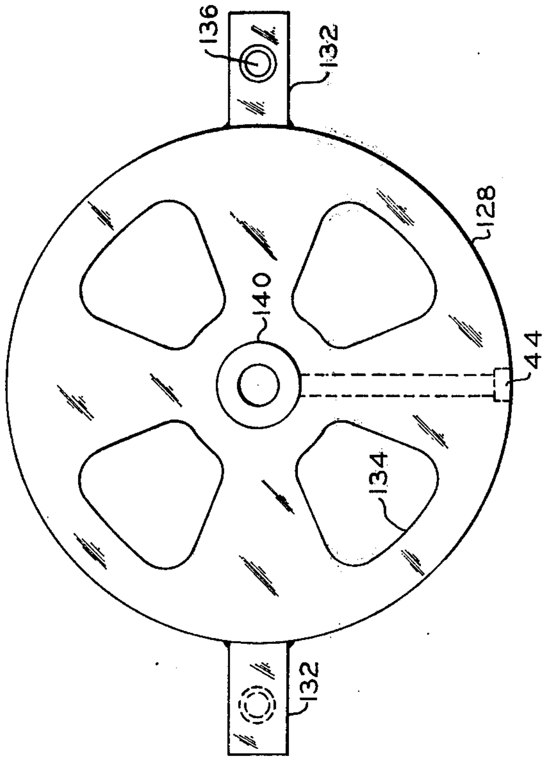
FIG. 6 is a view in elevation of another element of the dome of the combustor of FIG. 1.

Referring to FIGS. 4, 5, and 6, said dome member 18 comprises a fixed circular back plate 128 centrally mounted in an opening 138 provided in fuel flange 22 by means of a pair of mounting bars 132. A plurality of spaced apart openings 134, arranged in a circle, are provided in said plate 128. A stop pin 136 projects perpendicularly from one of said bars 132. Said opening 138 in fuel flange 22 is in communication with annular space 16 and conduit 15 of the combustor of FIG. 1 for admitting heated air to said annular space 16. A centrally disposed circular boss member 140 projects outwardly from the upstream face of said fixed plate 128 for receiving and mounting a front adjustable plate 142 thereon.

Said front plate 142 is circular-like, and of the same size as, said fixed plate 128. A plurality of spaced apart openings 144 are provided in said front plate 142 and correspond in size and circular arrangement to that of said openings 134 in backplate 128. A pair of spaced apart stop pins 146 project perpendicularly from the side of said front plate 142. An actuator tab 148 projects perpendicularly from one side of said front plate at a location spaced from said stop pins 146. Push rod 150 is pivotally connected to said actuator tab 148 in any suitable manner as shown. Said push rod 150 can be actuated in a back and forth manner by means of roller mechanism 152 mounted on the outside of fuel flange 22 in any suitable manner. Flexible shaft 154 extends through a control panel (not shown) and is connected to a rotatable knob (not shown) for movement of said shaft 154, said roller mechanism 152, and said rod 150 for rotating said front plate 142 within the limits imposed by stop pins 146 acting against stop pin 136.

In assembly, said fuel flange 22 is mounted between adjacent flanges as shown in FIG. 1. The upstream end of flame tube 14 fits to adaptor 26 which in turn is secured to the downstream face of dome member 18. Fuel conduit 20 extends through said flange 22 and communicates with a central cavity formed in the downstream side of dome member 18 which is adapted to receive fuel nozzle 24 mounted therein. The central opening 156 in front plate 142 fits onto boss member 140 on backplate 128 and said front plate is held in sliding engagement with backplate 128 by means of cap screw 158 and washer 160. Said push rod 150, by virtue of the back and forth movement described above, rotates said front plate 142 to bring openings 144 therein into and out of register with openings 134 in said backplate 128 to thus vary the effective size of opening provided in variable dome 18 and vary the amount of air passed through said dome into first combustion section 27. As shown in FIG. 1, said openings 144 and 134 are in full register and the dome member is completely open. As shown in FIG. 4, said openings are out of register and the dome member is completely closed.

In the practice of the invention, it is desirable to control the effective size of the openings in the variable dome 18 of the combustors of the invention in accordance with fuel flow to the combustor. This can be accomplished manually by means of the push rod 150 and associated elements. However, in continuously operating combustors which operate over a varied range of operating conditions, such as a driving cycle as described in the examples hereinafter, it is desirable that the effective size of the dome openings be controlled automatically. Any suitable control means can be provided for this purpose, for example, the control means diagrammatically illustrated in FIG. 4. Said control means can be adapted to the combustor of FIG. 1 by providing an orifice in fuel conduit 20 operatively connecting said orifice to a controller unit 109, and operatively connecting said controller unit by a suitable linkage 110, to shaft 154 of rack and roller mechanism 152 which moves push rod 150 back and forth. Thus, the controller 109, responsive to the flow of fuel through the orifice in conduit 20, actuates linkage 110, which is operatively connected to shaft 154, and programs the back and forth movement of rod 150. The specific control means comprising the orifice in fuel conduit 20, controller 109, and linkage 110 forms no part, per se, of the present invention. Said control means can be modified or substituted for by any means known in the art.

In one method of operating the combustors of the invention, e.g., the combustor of FIG. 1, a first stream of air is introduced through dome member 18 at a controlled rate into first combustion region 27 of the combustor. In the combustor of FIG. 1 said first stream of air is introduced generally axially with respect to said first combustion region. However, as discussed hereinafter, it is within the scope of the invention to introduce said first stream of air in a radial direction. A stream of fuel is introduced, preferably axially, into said first combustion region 27. In one presently preferred embodiment, said fuel is sprayed into said first combustion region as a hollow cone and said first stream of air is introduced around the stream of fuel and intercepts said cone. The rate of introduction of said first stream of air is controlled in accordance with the rate of introduction of said stream of fuel, as described elsewhere herein.

A second stream of air is tangentially introduced into said first combustion region 27 via tangential slots 28 in a direction tangential the wall of said first combustion region. Said slots 28 thus impart a swirl to said second stream of air. The direction of said swirl can be either clockwise or counter-clockwise. When employing the slots illustrated in FIG. 2 the direction of swirl will be clockwise, looking downstream in the flame tube. Said first and second streams of air form a combustible mixture with said fuel, and at least partial combustion of said mixture is caused in said first combustion region. Hot combustion products and any remaining said mixture is passed from said first combustion region 27, through orifice 29, and into second combustion region 31.

A third stream of air is tangentially introduced into said second combustion region via tangential slots 30 in a direction tangential the wall of said second combustion region. Said slots 30 thus impart a swirl to said third stream of air. The direction of swirl imparted to said third stream of air can be either clockwise or counter-clockwise, but is preferably opposite the direction of swirl imparted to said second stream of air by said slots 28. When employing the slots illustrated in FIG. 3 the direction of swirl of the third stream of air will be counter-clockwise, looking downstream of the flame tube. Said third stream of air surrounds said hot combustion products and any remaining mixture entering from the first combustion region, and mixes therewith. Combustion is essentially completed in said second combustion region.

Preferably, a fourth stream of air is introduced via openings 34 and mixes with combustion products leaving said second combustion region. Said fourth stream of air comprises quench or dilution air. The hot combustion gases then exit the combustor to a turbine or other utilization.

Figure 7:
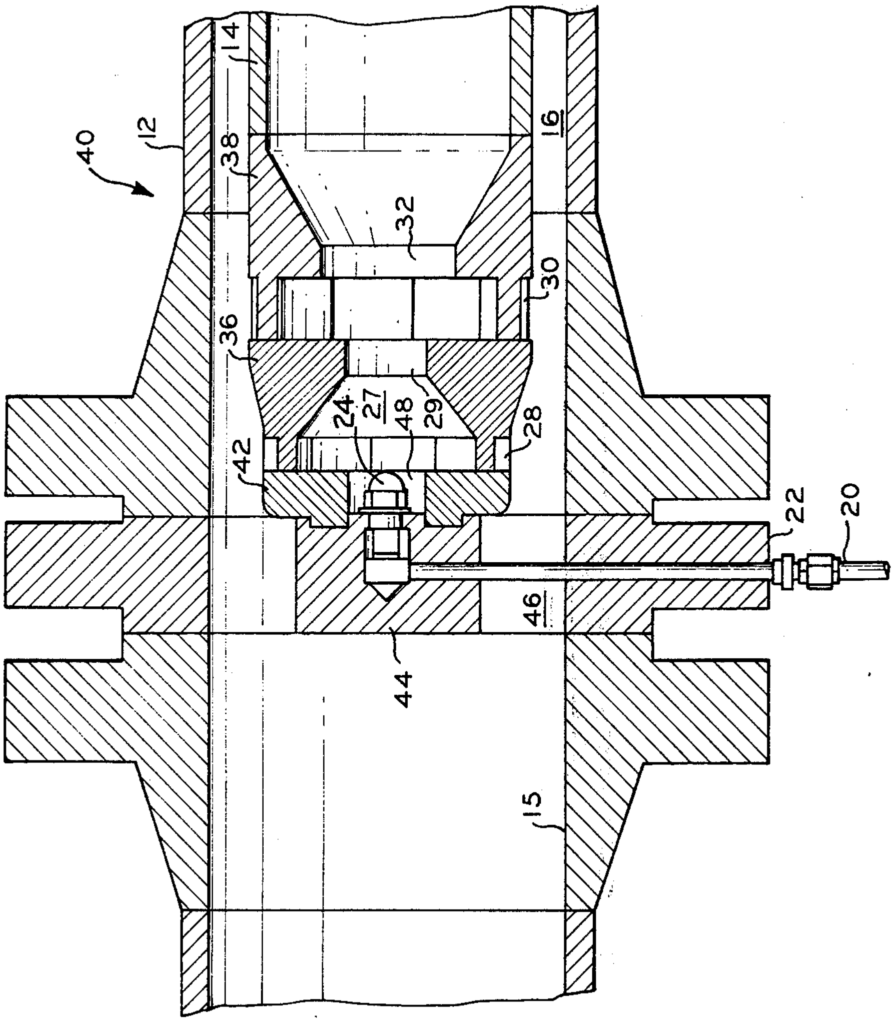
FIG. 7 is a view, partly in cross section, of a control combustor employed in evaluating the combustors of the invention.

FIG. 7 illustrates a control combustor, designated generally by the reference numeral 40, which was employed in evaluating the performance of the combustors of the invention. The principal difference between said combustor 40 and combustors of the invention, e.g., combustor 10 of FIG. 1, is that in combustor 40 no air is admitted through the dome. Thus, in said combustor 40 the upstream end of flame tube 14 is closed by closure member 42 which can be secured to said flame tube in any suitable manner. Said closure member 42 is secured to the central portion 44 of fuel flange 22 in any suitable manner. Said central portion 44 is supported in fuel flange 22 by means of support bars (not shown) so as to provide annular space 46 which permits air to enter annular space 16 from conduit 15.

The operation of said combustor 40 is substantially like that described above for combustor 10 of FIG. 1 except that no variable stream of air is admitted to the flame tube through the dome member 42. As shown by the data in the examples given hereinafter, the omission of said variable stream of air causes a marked increase in the production of $NO_x$ emissions.

Any other suitable variable dome means can be employed in the combustors of the invention instead of the above-described dome member 18. For example, referring to FIGS. 8, 9, and 10, the dome member can comprise a fixed generally cylindrical member 80 (see FIG. 9) closed at one end and open at the other end. A plurality of openings 82 are provided at spaced apart locations around the circumference of said cylindrical member 80 adjacent the closed end thereof. An opening 84 is provided in said closed end for receiving a fuel nozzle. The outlet of said fuel nozzle would be positioned similarly as shown for nozzle 24 in FIG. 1. Another opening 88 is provided in said closed end for receiving an igniter means (not shown) which would also extend to a position adjacent the outlet of the fuel nozzle. Openings 92 are provided for receiving mounting bolts (not shown) for mounting the dome member onto the central portion of a fuel flange such as central portion 44 shown in FIG. 7. Said central portion of the fuel flange would be adapted to accommodate the fuel nozzle similarly as shown in FIG. 7, and also the igniter means. A mounting flange 94 is connected to and provided around the open end of said cylindrical member 80 for mounting said member 80 on the upstream end of a combustor flame tube, e.g., flame tube 14 in FIG. 1. A groove 96 is provided in said flange 94 around the open base of said cylindrical member 80. A pair of spaced apart stop pins 98 project from said flange 94 perpendicular thereto and adjacent said cylindrical member 80. An orifice 95, preferably tapered inwardly, is provided in said flange 94 adjacent and in communication with the open end of said cylindrical member 80.

The adjustable throttle ring 100 of FIG. 8 is mounted around said cylindrical member 80 and is provided with a plurality of spaced apart openings 102 therein of a size, number, and shape and at spaced apart locations, corresponding to said openings 82 in cylindrical member 80. Said throttle ring fits into groove 96 in flange 94. An actuator pin 104 projects outwardly from the outer surface of said throttle ring 100 and coacts with said stop pins 98 to limit the movement of said ring 100. Friction lugs 106 are provided on the top and the bottom of said ring 100 for movably bearing against the surface on which cylindrical member 80 is mounted, and the bottom of groove 96, respectively. FIG. 10 is a cross section of ring 100 mounted on member 80.

Any suitable means can be provided for actuating actuator pin 104. Such actuating means can comprise a Y-shaped yoke which fits around actuator pin 104, with the bottom leg of the Y connected to a rotatable control rod which extends through the outer housing or casing of the combustor. Rotation of said control rod will pivot the Y-shaped yoke and coact with said pin 104 to cause rotation of throttle ring 100 within the limit of the space between stop pins 98 and thus adjust the register and effective size of the opening provided by openings 82 and 102. As shown in FIG. 10, said openings 82 and 102 are in direct register with each other to provide the maximum opening into the dome. When flange 94 is mounted on the upstream end of a flame tube, such as flame tube 14 in FIG. 1, air introduced through openings 82 and 102 will be introduced radially, e.g., around and generally perpendicular to the direction of introduction of fuel. Said openings 82 and 102 have been illustrated as being circular, and this is usually preferred. However, said openings can be rectangular, e.g., square, if desired.

In the above-described methods of operation the relative volumes of the various streams of air can be controlled by varying the sizes of the said openings, relative to each other, through which said streams of air are admitted to the flame tube of the combustor. The above-described variable dome 18 of FIG. 1 and the variable dome of FIGS. 8, 9, and 10 are employed to control the volume of air to the first combustion region. Flow meters or calibrated orifices can be employed in the conduits supplying said other streams of air, if desired.

It is within the scope of the invention to operate the combustors or combustion zones employed in the practice of the invention under any conditions which will give the improved results of the invention. For example, it is within the scope of the invention to operate said combustors or combustion zones at suitable inlet air temperatures up to about 1500° F., or higher; at pressures within the range of from about 1 to about 40 atmospheres, or higher; at flow velocities within the range of from about 1 to about 500 feet per second, or higher; and at heat input rates within the range of from about 30 to about 1200 Btu per pound of air. Generally speaking the upper limit of the temperature of the air streams will be determined by the means employed to heat same, e.g., the capacity of the regenerator or other heating means, and materials of construction in the combustor and/or the turbine utilizing the hot gases from the combustor. Generally speaking, operating conditions in the combustors of the invention will depend upon where the combustor is employed. For example, when the combustor is employed with a high pressure turbine, higher pressures and higher inlet air temperatures will be employed in the combustor. Thus, the invention is not limited to any particular operating conditions. As a further guide to those skilled in the art, but not to be considered as limiting on the invention, presently preferred operating ranges for other variables or parameters are: heat input, from 30 to 500 Btu/lb. of total air to the combustor; combustor pressure, from 3 to 10 atmospheres; and reference air velocity, from 50 to 250 feet per second.

The relative volumes of the above-described first, second, third, and quench or dilution air streams will depend upon the other operating conditions. Generally speaking the volume of the first stream of air introduced into the first combustion region can be in the range of from 0 to 50, preferably about 0 to about 30, volume percent of the total air to the combustor when operating over a driving cycle including idling, low speed, moderate speed, high speed, acceleration, and deceleration; the volume of the second stream of air can be in the range of from 0 to about 15, preferably about 5 to about 12 volume percent of the total air to the combustor; and the volume of the third stream of air can be in the range of from about 5 to about 25, preferably about 8 to about 18 volume percent of the total air to the combustor. When operating under substantially "steady state" conditions, such as in a stationary power plant or in turnpike driving, the volumes of said streams of air will depend upon the load, or the chosen speed of operation. The volume of the dilution or quench air can be any suitable amount sufficient to accomplish its intended purpose.

While in most instances, said first stream of air, said second stream of air, said third stream of air, and said dilution or quench air will originate from one common source such as a single compressor, it is within the scope of the invention for said streams of air to originate from different or separate sources. Separate heating means can be provided for heating the various streams of air, if convenient.

A number of advantages are realized in the practice of the invention. The combustors of the invention are low emission combustors. The invention provides small compact combustors which are particularly well suited to be employed in locations where space is important, e.g., under the hood of an automobile. Yet, the principles involved and the advances provided by the invention are applicable to combustors employed in larger power plants, e.g., large stationary gas turbine engines, boilers, etc. The variable domes employed in combination with the flame tubes in the combustors of the invention contribute to the overall efficiency of the combustors of the invention. Said variable dome is located in a relatively cool low stress region of the combustor, i.e., at the upstream end of the flame tube. Said variable dome is a small component comprising only one movable element which operates with only a small movement from a closed position to an open position. Thus, rapid response to changing operating conditions is provided. This combination of a variable dome with relatively small flame tubes in combustors of the invention renders said combustors of the invention particularly well suited for mobile installations. In contrast, the "variable hardware" of the prior art combustors usually provides for adjustments at a plurality of locations in the combustors, including adjustments to the hot flame tube itself. The result is usually a large, bulky, unit which in practical operation functions poorly, if at all.

While it is not intended to limit the invention as to any theories of operation, it defintely appears that the combustors of the invention are, to a large extent at least, self adjusting in operation. By this it is meant that the fuel-air mixtures produced and burned have characteristics of adjusting or varying in accordance with fuel flow. Referring to FIG. 1, at low fuel flows, e.g., idling, the flame stabilizers in the first combustion region 27. It is believed that the air introduced via tangential entry slots 28 has radial flow components, and other flow components, as well as the major tangential flow components. Said flow components apparently cause the creation of flame holding vortex actions and the flame stabilizes in the region(s) upstream of the inwardly tapered wall of the first combustion region 27. As fuel flow increases, and the amount of air introduced through the dome increases, the flame approaches orifice 29 and the other tangential air entry slots 30, a core of flame and hot combustion products is developed, and some of the air introduced via said slots 30 becomes involved. Under these conditions said core is isolated along the axis of the flame tube by the clockwise swirl of the air introduced via said slots 28. As fuel flow and dome air flow increase further, said core passes through orifice 29, past slots 30, and through orifice 32. The clockwise swirl is neutralized by the counterclockwise air from slots 30, and the flame stabilizes in second combustion region 31 adjacent the outwardly flared wall portion thereof. At high fuel flows and high dome air flows the flame penetrates further into said second combustion region 31 and is stabilized in the large central portion thereof. when the fuel flow is cut back, the flame retreats through the flame tube, the core is reformed, and the flame again stabilizes in the first combustion region because the dome air is also cut back when the fuel is cut back.

The above-described actions of the flame in the combustors of the invention have actually been observed by looking into the flame tube from the downstream end thereof. At low fuel flows and with the flame stabilized in the first combustion region, the flame is blue and the flame tube walls are red. The core is not luminous. When the flame is stabilized in the second combustion region the flame has the appearance of a light blue haze at low $NO_x$ producing conditions.

The above-described actions of the flame in the combustion process of the invention are, to a large extent at least, self-adjusting actions which are functions of the amount of the fuel introduced, the control of the amount of dome air introduced in accordance with the amount of said fuel, and the tangentially introduced second and third streams of air. As shown by the examples given hereinafter, the combustors of the invention and the combustion process of the invention produce low emissions of $NO_x$, CO and HC. Thus, the invention solves one of the most serious problems in the design and operation of combustors and combustion processes for the production of low emissions, i.e., the problem of how to effectively handle the wide range of introduced air required when the combustor is operated over a wide range of conditions such as a driving cycle as described herein. Said solution is provided by the invention combination comprising: fuel injection, variable first air stream injection, and tangential second air stream injection into a first combustion region; and tangential third air stream injection into a second combustion region.

The following examples will serve to further illustrate the invention.

EXAMPLE I

A series of runs was carried out to evaluate the performance of combustor A, the combustor employed as a control combustor in the evaluation of the combustors of the invention. The configuration of said combustor A was essentially like that illustrated in FIG. 7. Design details for said combustor A are set forth in Table I below. In this series of runs said combustor was operated over a test program consisting of six different driving conditions which simulate a vehicle traveling over a driving cycle. Said six driving conditions were deceleration, idling, low speed, moderate speed, high speed, and acceleration. The conditions employed in each of said six driving conditions are set forth in Table II below.

At each of the six driving conditions, a run was carried out wherein a stream of air was introduced into the first combustion region of the combustor flame tube via tangential entry slots 28, another stream of air was introduced into the second combustion region of said flame tube via tangential entry slots 30, and another stream of air was introduced into the quench region of the combustor via holes 34. The volumes of said streams of air were determined by the sizes of the openings admitting same. Said slots 28 formed 9.13 percent, said slots 30 formed 18.26 percent, and said holes 34 formed 72.6 percent, of the total open entry area into the flame tube. During each run the exhaust gas from the combustor was analyzed under specifically controlled conditions to determine the concentration of $NO_x$, CO, and unburned hydrocarbon (HC). In general, in said analyses the SAE recommended sampling procedure was followed, i.e., "Procedure For The Continuous Sampling and Measurement of Gaseous Emissions From Aircraft Turbine Engines," Society of Automotive Engineers, Inc. New York, Aerospace Recommended Practice 1256, (October 1971).

From the raw data thus obtained, the emission index (pounds of pollutant produced per 1000 pounds of fuel burned) was calculated for $NO_x$, CO, and HC. Emission index values and other data from said test runs are set forth in Table III below. Emission ratio values, weighted over the entire driving cycle on the basis of time and weight of fuel burned for each driving condition are also given. Said emission ratio values provide a convenient overall evaluation of combustor performance.

EXAMPLE II

Another series of test runs was carried out employing a series of nine combustors, each of which was a modification of combustor A of Example I. In one modified combustor the slots 28 were closed by covering same with a steel band. In another modified combustor said slots 28 were one-half closed by covering one-half the open area thereof with a steel band. In the other modifications a spacer means, e.g., a ring, was provided between the central portion 44 of fuel flange 22 and the dome member 42, and a number of holes, e.g., 0.25 inch diameter, were drilled through said spacer ring to provide communication between passage 46 in said fuel flange and the opening 48 in said dome member 42, and thus vary the total effective size of the total openings admitting air to the first combustion region 27 of the flame tube. A homologous series of ten combustors (including combustor A) was thus provided in which the stoichiometry in the first combustion region 27 varied from very fuel-rich to very fuel-lean. The purpose of said homologous series of combustors was to simulate a combustor provided with a variable dome, i.e., dome means whereby the amount of air admitted to the first combustion region 27 of the combustor could be varied and/or controlled in accordance with fuel flow to said first combustion region. Said combustor A and said nine modifications thereof provided a series of combustors wherein the open entry areas into the first combustion section 27 were 0.0, 4.8, 9.1, 10.7, 11.5, 12.3, 14.5, 16.6, 18.3, and 23.0 percent of the total open entry area into the flame tube of the combustor.

Each of said nine modified combustors was operated over a test program like that described in Example I above, and in the manner there described except that in the modified combustor wherein tangential entry slots 28 were covered, no air was admitted directly to the first combustion region 27. From the emission index data thus obtained from each of the 10 combustors (including combustor A data from Example I) a combustor was selected, for each of the six driving conditions, which with its particular open entry area gave the lowest $NO_x$ emissions. The CO and HC emision values obtained with each selected $NO_x$ value was also used, The thus selected data were then composited to provide data for a simulated composite combustor equipped with a variable dome. From said composited data, emission ratio values were calculated for $NO_x$, CO, and HC as described in Example I. The resulting data for said simulated composite combustor and set forth in Table IV below where, for the purpose of this example, said composite combustor is identified as combustor B.

EXAMPLE III

Another series of test runs was carried out to evaluate the performance of combustor C, a combustor in accordance with the invention. Said combustor C had a configuration essentially like that of the combustor illustrated in FIG. 1. As there shown, said combustor C was provided with a variable dome member 18 whereby the amount of air admitted to the first combustion region 27 of the combustor could be varied and/or controlled in accordance with fuel flow to said first combustion section. The design details for said combustor C are set forth in Table I below.

in the testing program of this example a series of runs was made at each of the above described six driving conditions employing various manually adjusted dome openings (percent of total open entry area in flame tube and dome) for admission of a variable volume of a first stream of air to the first combustion region 27, and to determine the optimum dome open area for producing the lowest $NO_x$ emissions without losing control of the CO and HC emissions. Otherwise, the testing procedure employed was substantially like that of Example I. Emission index values and other data, including emission ratio values for said combustor C when operated at said optimum dome openings are set forth in Table V below.

TABLE I

| | COMBUSTOR DESIGN | | |
|---|---|---|---|
| Combustor No. | A | B(1) | C(2) |
| Dome Air | Heated | | |
| Inlet type | — | Axial | Axial |
| Hole diam. in. | 0 | * | 0.94 × 0.94 |
| No. of Holes | 0 | * | 4 |
| Total hole area,sq.in. | 0 | 0 to 1.96 | 0 to 3.55 |
| % Total Comb. hole area | 0 | 0 to 13.8 | 0 to 25.3 |
| Fuel Nozzle | | | |
| Spray pattern | Cone | | |
| Spray angle, deg. | 45 | | |
| Flame Tube | | | |
| 1st Station Air | Heated | | |
| Diameter,in. | 3.00 | | |
| Inlet type | Tangential | | |
| Dist. from fuel inlet,in. | 0.25 | | |
| Slots,in. | 0.25 × 0.50 | | |
| No. of slots | 8 | 0 to 8 | |
| Total slot area,sq.in. | 1.00 | 0 to 1.00 | 1.00 |
| % Total Comb. hole area | 9.13 | 0 to 9.13 | 9.6 to 7.10 |

TABLE I-continued

| Combustor No. | COMBUSTOR DESIGN A | B[1] | C[2] |
|---|---|---|---|
| Exit Orifice, diam.in. | 1.25 | | 1.50 |
| Exit Orifice,Area,sq.in. | 1.23 | | 1.77 |
| 2nd Station Air | Heated | | |
| Diameter,in. | 3.50 | | |
| Inlet type | Tangential | | |
| Dist.from fuel inlet,in. | 2.5 | | 2.375 |
| Slots,in. | 0.25 × 1.00 | | 0.25 × 0.75 |
| No. of slots | 8 | | |
| Total slot area,sq.in. | 2.00 | 2.00 | 1.50 |
| % Total Comb.hole area | 18.26 | 20.1 to 15.5 | 14.40 to 10.70 |
| Exit Orifice,diam.in. | 2.25 | | 2.00 |
| Exit Orifice, Area,sq.in. | 3.98 | | 4.91 |
| 3rd Station, Quench Air | Heated | | |
| Diameter,in. | 4.03 | | |
| Inlet type | Radial | | |
| Dist.from fuel inlet,in. | 10.00 | | |
| Holes,diam.in. | 1.125 | | |
| No. of holes | 8 | | |
| Total hole area,sq.in. | 7.95 | 7.95 | 7.95 |
| % Total Comb.hole area | 72.61 | 79.9 to 61.57 | 76.00 to 56.90 |
| Combustor Length, in. | 10.00 | | |
| 1st.Comb.Section,in. | 2.00 | | |
| 2nd.Comb.Section,in. | 8.00 | | |
| Combustor Volume,cu.in. | 94.5 | | 92.0 |
| 1st.Comb.Section,cu.in. | 7.9 | | 8.5 |
| 2nd.Comb.Section,cu.in. | 86.6 | | 83.5 |

[1]Composite for series of combustors, modifications of combustor A, only values that were changed are shown.
*See Example II.
[2]Modification of combustor A, only values that were changed are shown.

TABLE II

TEST CONDITIONS FOR EVALUATING COMBUSTOR PERFORMANCE

| Simulated Federal Driving Cycle: Condition | Time % Total | Combustor Operating Conditions: Inlet Air Pressure, in.Hg.abs | Inlet Air Temp., F. | Air Flow, lb/sec.(a) | Fuel Flow, lb/hr.(b) | Heat Input Btu/lb Air |
|---|---|---|---|---|---|---|
| Deceleration | 10 | 90 | 1200 | 1.40 | 13.5 | 50 |
| Idle | 20 | 45 | 1000 | 0.72 | 10.5 | 75 |
| Low Speed(c) | 40 | 55 | 1200 | 0.89 | 19.0 | 110 |
| Moderate Speed(c) | 10 | 70 | 1200 | 1.14 | 31.8 | 145 |
| High Speed(c) | 10 | 90 | 1200 | 1.40 | 48.6 | 180 |
| Acceleration | 10 | 45 | 1000 | 0.72 | 41.8 | 300 |

(a)Absolute humidity controlled at 75 grains of water vapor per pound of dry air.
(b)ASTM Jet A aviation-turbine kerosine.
(c)Low Speed = up to about 20 miles per hour; moderate speed = from about 20 to about 40 miles per hour; and high speed = above about 40 miles per hour.

TABLE III

PERFORMANCE OF COMBUSTOR NO. A

| Simulated Driving Condition | Emission Index, gm Pollutant/kgm Fuel: $NO_x$ | CO | HC | Pressure Drop, % |
|---|---|---|---|---|
| Deceleration | 8.72 | 5.88 | 0.23 | 6.0 |
| Idle | 8.37 | 6.13 | 0.16 | 5.6 |
| Low Speed | 30.22 | 7.85 | 0.09 | 6.4 |
| Moderate Speed | 37.48 | 9.03 | 0.00 | 6.4 |
| High Speed | 24.22 | 5.21 | 0.05 | 6.1 |
| Acceleration | 3.33 | 5.68 | 0.05 | 6.7 |
| Federal Driving Cycle,gm/mi | 6.577 | 2.039 | 0.023 | |
| | Emission Ratio[a] | | | |
| | 16.44 | 0.60 | 0.06 | |

(a) Amount of pollutant emitted over simulated Federal Driving Cycle (b) / Amount of pollutant permitted by 1976 Statutory Requirement (c)
(b) Calculated for 10 mpg fuel economy.
(c) 0.4 g/mi $NO_x$, 3.4 g/mi CO, and 0.41 g/mi HC.

TABLE IV

PERFORMANCE OF COMBUSTOR NO. B

| Simulated Driving Condition | Emission Index, gm Pollutant/kgm Fuel: $NO_x$ | CO | HC | Pressure Drop, % | Dome Open Area, % Total[a] |
|---|---|---|---|---|---|
| Deceleration | 0.2 | 55.6 | 1.5 | 5.1 | 11.5 |
| Idle | 0.3 | 45.4 | 1.5 | 4.4 | 12.3 |
| Low Speed | 0.6 | 5.2 | 0.1 | 4.5 | 23.0 |
| Moderate Speed | 4.7 | 3.4 | 0.1 | 5.0 | 23.0 |
| High Speed | 8.7 | 6.5 | 0.0 | 6.7 | 0.0 |

TABLE IV-continued

PERFORMANCE OF COMBUSTOR NO. B

| Simulated Driving Condition | Emission Index, gm Pollutant/kgm Fuel | | | Pressure Drop, % | Dome Open Area, % Total[b] |
|---|---|---|---|---|---|
| | $NO_x$ | CO | HC | | |
| Acceleration | 3.0 | 5.9 | 0.0 | 6.7 | 0.0 |
| Federal Driving Cycle,gm/mi | 0.970 | 3.565 | 0.080 | | |
| | Emission Ratio[a] | | | | |
| | 2.43 | 1.05 | 0.20 | | |

[a]See Table III
[b]Percent of total open area to combustor (dome plus flame tube)

TABLE V

PERFORMANCE OF COMBUSTOR NO. C

| Simulated Driving Condition | Emission Index, gm Pollutant/kgm Fuel | | | Pressure Drop % | Dome Open Area % Total[b] |
|---|---|---|---|---|---|
| | $NO_x$ | CO | HC | | |
| Deceleration | 5.31 | 6.52 | 0.19 | 5.0 | 5.1 |
| Idle | 1.44 | 2.31 | 0.17 | 5.3 | 3.7 |
| Low Speed | 0.57 | 8.30 | 0.18 | 5.3 | 9.0 |
| Moderate Speed | 0.85 | 7.24 | 0.09 | 4.7 | 14.8 |
| High Speed | 3.05 | 3.47 | 0.00 | 4.0 | 25.1 |
| Acceleration | 2.59 | 6.01 | 0.00 | 7.3 | 0.0 |
| Federal Driving Cycle,gm/mi | 0.553 | 1.828 | 0.030 | | |
| | Emission Ratio[a] | | | | |
| | 1.38 | 0.54 | 0.07 | | |

[a]See Table III
[b]See Table IV

Referring to the above Table III, it is evident that combustor A is not a low emission combustor. The control of CO emissions was good over the complete range of test conditions. The HC emissions were negligible. However, the $NO_x$ emissions were excessive.

A comparison of the emission ratio data in Tables III and IV shows that the composite combustor B represented by the data in Table IV was a much improved combustor, emission-wise.

A comparison of the data in Table V with that in Tables III and IV clearly shows the superiority and advantages of combustor C, a combustor in accordance with the invention. Based on these data, and the above-discussed actual observations of combustors of the invention in operation, it is concluded that: the fuel injection, the varying of the first air stream injection in accordance with the fuel injection, and the tangential second air stream injection, into the first combustion region; and the tangential third air stream injection into the second combustion region, are important cooperating factors in the improved results obtained in the practice of the invention.

The term "air" is employed generically herein and in the claims to include air and other combustion-supporting gases.

The terms "combustion" and "partial combustion," when employed with reference to combustion of a fuel, are employed generically herein and in the claims, unless otherwise specified, to include not only the process of burning with a flame, but also to include other rapid oxidation processes or reactions which are not necessarily accompanied by a flame. Such "other rapid oxidation processes or reactions" are sometimes referred to as "pre-flame reactions" in the combustion art.

While the invention has been described above in terms of using a liquid fuel, the invention is not limited to the use of liquid fuels. It is within the scope of the invention to use vaporous or gaseous fuels, including prevaporized liquid fuels.

The design parameters set forth in the above Table I have been included for illustrative purposes and are not intended to be limiting on the invention.

Thus, while certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A combustor, comprising, in combination:
   - a flame tube;
   - a dome member disposed at the upstream end of said flame tube;
   - a fuel inlet means disposed in said dome member for introducing a stream of fuel into an upstream first combustion section of said flame tube;
   - a variable first air inlet means provided in said dome member for admitting a variable volume of a first stream of air through said dome member, around said fuel inlet means, and into said first combustion section of said flame tube;
   - a second air inlet means disposed in the wall of said flame tube for admitting a second stream of air into said first combustion section in a circumferential direction and tangential to the wall thereof;
   - a third air inlet means disposed in the wall of said flame tube downstream from said second air inlet means for admitting a third stream of air into a second combustion section in a circumferential direction and tangential to the wall thereof, said second combustion section being located in said flame tube downstream from and in communication with said first combustion section; and means for controlling the volume of said first stream of air in accordance with the rate of introduction of said fuel.

2. A combustor according to claim 1, comprising, in further combination:

an outer casing; and wherein said flame tube is disposed in said casing and spaced apart therefrom to form an annular chamber between said casing and said flame tube; and said second air inlet means and said third air inlet means are each in communication with said annular chamber for respectively admitting said second and thrid streams of air into said flame tube from said annular chamber.

3. A combustor according to claim 2 wherein said variable first air inlet means disposed in said dome member comprises:

at least one air passage means of variable cross-sectional area provided in and extending through said dome member into communication with said first combustion section; and means for varying the cross-sectional area of said air passage means and thus controlling the volume of said first stream of air admitted to said first combustion section.

4. A combustor according to claim 3 wherein said means for varying the cross-sectional area of said air passage means in said dome member includes means for varying said cross-sectional area in accordance with the rate of flow of fuel to said combustor.

5. A combustor according to claim 3 wherein said air passage means in said dome member extends axially therethrough for admitting said first stream of air in an axial direction with respect to said first combustion section and coaxially with respect to said fuel inlet means.

6. A combustor according to claim 3 wherein said air passage means in said dome member extends radially therethrough for admitting said first stream of air in a radial direction with respect to said first combustion section and said fuel inlet means.

7. A method for the combustion of a fuel in a combustion zone having a defined first upstream combustion region, and a defined second combustion region located adjacent, downstream from, and in communication with said first combustion region, which method comprises, in combination:

introducing a stream of fuel into the upstream end portion of said first combustion region;

introducing a first stream of air at a controlled but variable rate into said upstream end portion of said first combustion region and around said stream of fuel;

introducing a second stream of air into said first combustion region in a circumferential direction and tangential to the wall thereof, and forming a combustible mixture of said fuel and said streams of air;

causing at least partial combustion of said combustible mixture and forming hot combustion products;

introducing a third stream of air into said second combustion region in a circumferential direction and tangential to the wall thereof; and controlling said variable rate of introduction of said first stream of air in accordance with the rate of introduction of said fuel.

8. A method according to claim 7 wherein:

said tangentially introduced second stream of air is introduced in one of a clockwise direction and a counter-clockwise direction, looking downstream in said combustion zone; and said tangentially introduced third stream of air is introduced in the other of said clockwise and counter-clockwise directions which is different from the direction of introduction of said second stream of air.

9. A method according to claim 8 wherein:

said fuel is introduced generally axially with respect to said first combustion region; and said first stream of air is introduced around said fuel in a direction generally axial with respect to said first combustion region.

10. A method according to claim 8 wherein:

said fuel is introduced as a hollow cone which diverges from its point of introduction; and said first stream of air is introduced around said fuel, intercepts said cone, and mixes with said fuel.

11. A method according to claim 8 wherein:

said fuel is introduced generally axially with respect to said first combustion region; and said first stream of air is introduced around said fuel in a direction which is generally perpendicular to the direction of introduction of said fuel.

12. A method for the combustion of a fuel in a combustion zone to produce hot combustion gases having low emissions of $NO_x$, CO, and HC, said combustion zone having a defined first upstream combustion region, and a defined second combustion region located adjacent and downstream from said first combustion region, which method comprises, in combination:

introducing a stream of fuel into the upstream end portion of said first combustion region;

introducing a first stream of air at a controlled but variable rate into said upstream end portion of said first combustion region and around said stream of fuel;

introducing a second stream of air into said first combustion region in a circumferential direction and tangential to the wall thereof, and forming a combustible mixture of said fuel and said streams of air;

causing at least partial combustion of said combustible mixture so as to form hot combustion products therefrom;

passing hot combustion products and any remaining said mixture from said defined first combustion region into said defined second combustion region;

introducing a third stream of air into said defined second combustion region in a circumferential direction and tangential to the wall thereof, and around said hot combustion products entering said second combustion region; and controlling said variable rate of introduction of said first stream of air in accordance with the rate of introduction of said fuel.

13. A method according to claim 12 wherein:

said fuel is introduced generally axially with respect to said first combustion region; and the rates of introduction of each of said fuel, said first stream of air, and said second stream of air are such that the flame from combustion of said combustible mixture is seated in said first combustion region.

14. A method according to claim 12 wherein:

said fuel is introduced generally axially with respect to said first combustion region;

the rates of introduction of each of said fuel, said first stream of air, and said second stream of air are such that a core comprising flame and hot combustion products forms along the axis of said first combustion region; and said second stream of air is swirling in a clockwise direction around said core.

15. A method according to claim 14 wherein:

upon a sufficient increase in the rates of introduction of said fuel and said first stream of air, said core is caused to move downstream from said first combustion region and into said second combustion region;

said third stream of air is introduced with a swirl in a counterclockwise direction and neutralizes said clockwise swirl of said second stream of air; and said flame is stabilized in said second combustion region.

16. A method according to claim 12 wherein:

said fuel is introduced generally axially with respect to said first combustion region; and the rates of introduction of said fuel, said first stream of air, and said second stream of air are such that the flame from combustion of said combustible mixture has been caused to move downstream from said first combustion region and into said second combustion region and is there stabilized.

17. A method according to claim 16 wherein upon a sufficient decrease in the rates of introduction of said fuel and said first stream of air, said frame retreats upstream from said second combustion region and into said first combustion region and is there stabilized.

18. A combustor comprising, in combination:

an outer casing;

a flame tube disposed in said casing and spaced apart therefrom to form an annular chamber between said casing and said flame tube;

a dome member disposed at the upstream end of said flame tube;

a fuel inlet means disposed in said dome member for introducing a stream of fuel into an upstream first combustion section of said flame tube;

a variable first air inlet means comprising at least one air passage of variable cross-sectional area provided in and extending through said dome member for admitting a variable volume of a first stream of air through said dome member, around said fuel inlet means, and into said first combustion section;

means for varying the cross-sectional area of said air passage and thus controlling the volume of said first stream of air;

an annular orifice means disposed in said flame tube on the downstream side of said dome member;

a first orifice formed in said orifice means, and defining the outlet from said dome member and the inlet to said first combustion section;

a second air inlet means comprising a plurality of tangential slots disposed in and extending through the wall of the upstream end portion of said flame tube into communication with said annular chamber, adjacent and downstream from said first orifice, for admitting a second stream of air from said annular chamber into said first combustion section in a circumferential direction and tangential to the wall thereof;

a second orifice disposed in said flame tube downstream from said tangential slots and defining the outlet from said first combustion section;

a third air inlet means comprising a plurality of tangential slots disposed in and extending through the wall of an intermediate portion of said flame tube into communication with said annular chamber, adjacent and downstream from said second orifice, for admitting a third stream of air from said annular chamber into a second combustion section in a circumferential direction and tangential to the wall thereof, said second combustion section being located in said flame tube downstream from and in communication with said first combustion section via said second orifice; and a third orifice disposed in said flame tube adjacent and downstream from said last-mentioned tangential slots.

19. A combustor according to claim 18 wherein:

the inner wall surface of said flame tube tapers inwardly from the downstream edge of said first-mentioned slots to the upstream edge of said second orifice to form an inwardly tapered passageway from said slots to said orifice; and the inner wall surface of said flame tube tapers outwardly from the downstream edge of said third orifice to form an outwardly tapered passageway from said orifice.

20. A combustor comprising, in combination:

an outer casing;

a flame tube disposed in said casing and spaced apart therefrom to form an annular chamber between said casing and said flame tube;

a dome member disposed at the upstream end of said flame tube;

a fuel inlet means disposed in said dome member for introducing a stream of fuel into an upstream first combustion section of said flame tube;

a variable first air inlet means provided in said dome member for admitting a variable volume of a first stream of air through said dome member, around said fuel inlet means, and into said first combustion section of said flame tube;

an annular orifice means disposed in said flame tube on the downstream side of said dome member;

an orifice formed in said orifice means, and defining the outlet from said dome member and the inlet to said first combustion section;

a second air inlet means comprising a plurality of tangential slots formed in an upstream first wall section of said flame tube, adjacent the upstream end of said first wall section, and in communication with said annular chamber for admitting a second stream of air from said annular chamber into said first combustion section in a circumferential direction and tangential to the wall thereof;

an orifice formed in said first wall section adjacent the downstream end thereof and defining the outlet from said first combustion section;

a third air inlet means comprising a plurality of tangential slots formed in an intermediate second wall section of said flame tube and adjacent the upstream end of said second wall section, said second wall section being located adjacent and downstream from said first wall section, and said tangential slots being in communication with said annular chamber for admitting a third stream of air from said annular chamber into a second combustion section in a circumferential direction and tangential to the wall thereof, said second combustion section being located in said flame tube downstream from and in communication with said first combustion section via said orifice formed in said first wall section; and an orifice formed in said second wall section adjacent and downstream from said tangential slots therein.

21. A combustor according to claim 20 wherein:

said annular orifice means comprises an annular adaptor disposed between the downstream end of said dome member and the upstream end of said flame tube;

said first wall section comprises the upstream end portion of said flame tube, and said tangential slots formed in said first wall section are formed in the upstream end portion thereof with the downstream wall of said adaptor forming the upstream walls of said slots;

the inner wall surface of said first wall section tapers inwardly from the downstream edge of said tangential slots to the upstream edge of said orifice in said first wall section to form an inwardly tapered passageway from said slots to said orifice;

said second wall section is disposed with its upstream edge contiguous to the downstream edge of said first wall section, and said tangential slots formed in said second wall section are formed in the upstream end portion thereof with the downstream edge of said first section forming the upstream walls of said slots;

said orifice formed in said second wall section adjoins said tangential slots formed therein; and the inner wall surface of said second wall section tapers outwardly from the downstream edge of said orifice therein to form an outwardly flaring passageway from said orifice.

22. A combustor according to claim 21 wherein a fourth air inlet means is provided in the wall of said flame tube downstream from said third air inlet means for admitting a fourth stream of air comprising quench or dilution air into said flame tube.

23. A combustor comprising, in combination:

a flame tube;

a dome member disposed at the upstream end of said flame tube;

a fuel inlet means disposed in said dome member for introducing a stream of fuel into a first combustion section of said flame tube;

a variable first air inlet means provided in said dome member for admitting a variable volume of a first stream of air through said dome member, around said fuel inlet means, and into said first combustion section of said flame tube;

an annular orifice means disposed in said flame tube on the downstream side of said dome member;

a first orifice formed in said orifice means, and defining the outlet from said dome member and the inlet to said first combustion section;

a second air inlet means comprising a plurality of tangential slots disposed in and extending through the wall of the upstream end portion of said flame tube, adjacent and downstream from said first orifice, for admitting a second stream of air into said first combustion section in a circumferential direction and tangential to the wall thereof;

a second orifice disposed in said flame tube downstream from said tangential slots and defining the outlet from said first combustion section;

a third air inlet means comprising a plurality of tangential slots disposed in and extending through the wall of an intermediate portion of said flame tube, adjacent and downstream from said second orifice, for admitting a third stream of air into a second combustion section in a circumferential direction and tangential to the wall thereof, said second combustion section being located in said flame tube downstream from and in communication with said first combustion section via said second orifice; and a third orifice disposed in said flame tube adjacent and downstream from said last-mentioned tangential slots.

24. A combustor, comprising, in combination:

a flame tube;

a dome member disposed at the upstream end of said flame tube;

a fuel inlet means disposed in said dome member for introducing a stream of fuel into an upstream first combustion section of said flame tube;

a variable first air inlet means provided in said dome member for admitting a variable volume of a first stream of air through said dome member, around said fuel inlet means, and into said first combustion section of said flame tube;

a second air inlet means disposed in the wall of said flame tube for admitting a second stream of air into said first combustion section in a circumferential direction and tangential to the wall thereof;

a third air inlet means disposed in the wall of said flame tube downstream from said second air inlet means for admitting a third stream of air into a second combustion section in a circumferential direction and tangential to the wall thereof, said second combustion section being located in said flame tube downstream from and in communication with said first combustion section;

an orifice means disposed on the upstream side of said third air inlet means, and defining the outlet from said first combustion section and the inlet to said second combustion section; and means for controlling the volume of said first stream of air in accordance with the rate of introduction of said fuel.

25. A method for the combustion of a fuel in a combustion zone to produce hot combustion gases having low emissions of $NO_x$, CO, and HC, said combustion zone having a defined first upstream combustion region, and a defined second combustion region located adjacent and downstream from said first combustion region, which method comprises, in combination:

introducing a stream of fuel into the upstream end portion of said first combustion region;

introducing a first stream of air at a controlled but variable rate into said upstream end portion of said first combustion region and around said stream of fuel;

introducing a second stream of air into said first combustion region in a circumferential direction and tangential to the wall thereof, and forming a combustible mixture of said fuel and said streams of air;

causing at least partial combustion of said combustible mixture so as to form hot combustion products therefrom;

passing hot combustion products and any remaining said mixture from said defined first combustion region, through a region of restricted cross sectional area, and into said defined second combustion region;

introducing a thrid stream of air into said defined second combustion region in a circumferential direction and tangential to the wall thereof, and around said hot combustion products entering said second combustion region; and controlling said variable rate of introduction of said first stream of air in accordance with the rate of introduction of said fuel.

* * * * *